US012512629B2

(12) United States Patent
Huang et al.

(10) Patent No.: US 12,512,629 B2
(45) Date of Patent: Dec. 30, 2025

(54) ELECTRICAL CONNECTION ASSEMBLY

(71) Applicant: ACES Electronics Co., Ltd., Taoyuan (TW)

(72) Inventors: Kuo Hua Huang, Taoyuan (TW); Cheng Hsiang Hsueh, Taoyuan (TW); I Chiao Tso, Taoyuan (TW)

(73) Assignee: ACES Electronics Co., Ltd., Taoyuan (TW)

( * ) Notice: Subject to any disclaimer, the term of this patent is extended or adjusted under 35 U.S.C. 154(b) by 414 days.

(21) Appl. No.: 18/163,290

(22) Filed: Feb. 2, 2023

(65) Prior Publication Data

US 2024/0128689 A1 Apr. 18, 2024

(30) Foreign Application Priority Data

Sep. 30, 2022 (TW) ................................. 111137417

(51) Int. Cl.
*H01R 13/6585* (2011.01)
*H01R 13/518* (2006.01)
(Continued)

(52) U.S. Cl.
CPC ....... *H01R 13/6585* (2013.01); *H01R 13/518* (2013.01); *H01R 13/6471* (2013.01); *H01R 13/652* (2013.01); *H01R 13/6597* (2013.01)

(58) Field of Classification Search
CPC .............. H01R 13/6585; H01R 13/518; H01R 13/6471; H01R 13/652; H01R 13/6597;
(Continued)

(56) References Cited

U.S. PATENT DOCUMENTS 6,159,021 A * 12/2000 Kusuhara ............. H01R 12/716 439/74
7,037,138 B2 5/2006 Lang et al.
(Continued)

FOREIGN PATENT DOCUMENTS

CN 205911460 U 1/2017
CN 108631094 A 10/2018
(Continued)

*Primary Examiner* — Truc T Nguyen
(74) *Attorney, Agent, or Firm* — CKC & Partners Co., LLC

(57) ABSTRACT

An electrical connection assembly includes two electrical connectors and a bridge connector. Each of the two electrical connectors includes plural terminals and an insulation housing that accommodates the terminals. The bridge connector is located between the two electrical connectors. The bridge connector includes an insulation body, a conductive plastic, plural signal terminals, and plural ground terminals. The conductive plastic is covered by the insulation body. The ground terminals and the signal terminals of the bridge connector are arranged at intervals. The ground terminals of the bridge connector are in electrical contact with the conductive plastic. When two opposite sides of the insulation body are respectively coupled to the two electrical connectors so as to be surrounded by the two electrical connectors, the ground terminals of the bridge connector are respectively in electrical contact with the ground terminals of the two electrical connectors.

13 Claims, 6 Drawing Sheets

(51) Int. Cl.

| | |
|---|---|
| ***H01R 13/6471*** | (2011.01) |
| ***H01R 13/652*** | (2006.01) |
| ***H01R 13/6597*** | (2011.01) |

(58) Field of Classification Search

CPC . H01R 12/7082; H01R 12/73; H01R 13/6599

See application file for complete search history.

(56) References Cited

U.S. PATENT DOCUMENTS 8,449,330 B1 * 5/2013 Schroll ................ H01R 13/514 439/607.06
11,715,911 B2 * 8/2023 Tryson ............... H01R 13/6597 439/108
2012/0003848 A1 * 1/2012 Casher ................. H05K 1/0222 174/262
2012/0264334 A1 * 10/2012 Laurx .................... H01R 31/06 439/628
2015/0031240 A1 * 1/2015 Yang .................. H01R 13/6588 439/607.08
2016/0344134 A1 11/2016 Lin et al.
2018/0124921 A1 * 5/2018 Song ...................... H05K 1/148
2019/0173209 A1 6/2019 Lu et al.
2021/0194183 A1 6/2021 Guo
2021/0296831 A1 * 9/2021 Wu ........................ H01R 13/40
2021/0399488 A1 * 12/2021 Song .................. H01R 13/6591
2022/0173550 A1 6/2022 Liu et al.
2023/0187879 A1 * 6/2023 Tamai .................. H01R 13/405 439/108
2024/0030658 A1 * 1/2024 Little ................. H01R 13/6594
2024/0213696 A1 * 6/2024 Tharp .................. H01R 12/716

FOREIGN PATENT DOCUMENTS

CN 111244686 A 6/2020
CN 112072401 A 12/2020
CN 213304514 U 5/2021
CN 215955647 U 3/2022
TW I754339 B 2/2022

* cited by examiner

300

ELECTRICAL CONNECTION ASSEMBLY

CROSS-REFERENCE TO RELATED APPLICATIONS

This application claims priority to Taiwan Application Serial Number 111137417, filed Sep. 30, 2022, which is herein incorporated by reference.

BACKGROUND

Field of Invention

The present disclosure relates to an electrical connection assembly. More particularly, the present disclosure relates to an electrical connection assembly having a bridge connector.

Description of Related Art

To achieve electrical connection between different electronic devices, various types of electrical connectors have existed. The electrical connectors may include the type of a wire end connector and the type of a board end connector according to disposed positions, in which the wire end connector is located at one end of a cable and is used to adapt and couple to the board end connector, while the board end connector is disposed on a printed circuit board. With the continuous advancement and innovation of the technology of various electronic products, the performance of new electronic products has been greatly improved, and the types of electrical signals tend to be more diverse and require more bandwidth. Therefore, the demand for high-speed connectors is also increasing to apply to high-speed and high-frequency connections.

However, in order to meet the transmission of a large amount of data, the transmission bandwidth of the electrical connector needs to be increased, and when the transmission bandwidth is increased, the frequency of a transmitted electronic signal must be increased. The higher the combined height of mating electrical connectors, the longer the length of transmitted signal terminals, which results in crosstalk phenomenon when using high-frequency signals, thereby affecting the transmission of signals. In addition, for the installation environment of electrical connectors, two traditional mating connectors have the restriction of mating height.

SUMMARY

One aspect of the present disclosure provides an electrical connection assembly.

According to some embodiments of the present disclosure, an electrical connection assembly includes two electrical connectors and a bridge connector. Each of the two electrical connectors includes a plurality of terminals and an insulation housing that accommodates the terminals. The bridge connector is located between the two electrical connectors and includes an insulation body, a conductive plastic, a plurality of signal terminals, and a plurality of ground terminals. The conductive plastic is covered by the insulation body, the ground terminals and the signal terminals of the bridge connector are arranged at intervals, and the ground terminals of the bridge connector are in electrical contact with the conductive plastic.

In some embodiments, the conductive plastic is I-shaped or 王 -shaped.

In some embodiments, when two opposite sides of the insulation body are respectively coupled to the two electrical connectors so as to be surrounded by the two electrical connectors, the ground terminals of the bridge connector are located between the conductive plastic and the terminals of the two electrical connectors.

In some embodiments, the conductive plastic has a main portion and a plurality of finger portions protruding from the main portion, and the ground terminals of the bridge connector are respectively located on the finger portions.

In some embodiments, the finger portions are symmetrically disposed along two opposite sides of the main portion.

In some embodiments, there is a distance between the main portion and a side of each of the finger portions that is distal to the main portion.

In some embodiments, a lengthwise direction of the finger portions of the conductive plastic is the same as a lengthwise direction of the ground terminals of the bridge connector.

In some embodiments, a distance between two adjacent ones of the finger portions of the conductive plastic is greater than a distance between two adjacent ones of the signal terminals.

In some embodiments, each of the terminals of the two electrical connectors comprises a contact portion, a fixed portion, and a welding portion that are connected in sequence, and the contact portion extends outward from a surface facing away from the bridge connector. When two opposite sides of the insulation body are respectively coupled to the two electrical connectors so as to be surrounded by the two electrical connectors, the contact portion is in electrical contact with one of the ground terminals of the bridge connector.

In some embodiments, each of the two electrical connectors has an accommodating recess, the insulation body of the bridge connector has two protruding portions facing away from each other, the two protruding portions are respectively inserted into the two accommodating recesses of the two electrical connectors, and the ground terminals of the bridge connector extend from one of the two protruding portions to the other.

In some embodiments, the insulation body of the bridge connector has a block portion surrounding the two protruding portions. When the two protruding portions are configured to be respectively inserted into the two accommodating recesses, two opposite sides of the block portion respectively abut against the two electrical connectors.

In some embodiments, the signal terminals of the bridge connector are spaced apart from the conductive plastic.

Another aspect of the present disclosure provides an electrical connection assembly.

According to some embodiments of the present disclosure, an electrical connection assembly includes two electrical connectors and a bridge connector. Each of the two electrical connectors includes a plurality of terminals and an insulation housing that accommodates the terminals. The bridge connector is located between the two electrical connectors and includes an insulation body, a conductive plastic, a plurality of signal terminals, and a plurality of ground terminals. The conductive plastic is covered by the insulation body, the ground terminals and the signal terminals of the bridge connector are arranged at intervals. When two opposite sides of the insulation body are respectively coupled to the two electrical connectors so as to be surrounded by the two electrical connectors, the ground terminals of the bridge connector are located between the conductive plastic and the terminals of the two electrical connectors.

In some embodiments, the conductive plastic has a main portion and a plurality of finger portions protruding from the main portion, and the ground terminals of the bridge connector are respectively located on the finger portions.

In some embodiments, the signal terminals of the bridge connector are spaced apart from the conductive plastic.

In the aforementioned embodiments of the present disclosure, since the bridge connector of the electrical connection assembly has the conductive plastic, the signal terminals and the ground terminals, and the ground terminals of the bridge connector are in electrical contact with the conductive plastic, when two opposite sides of the insulation body of the bridge connector are respectively coupled to the two electrical connectors so as to be surrounded by the two electrical connectors, the ground terminals of the bridge connector can be respectively in electrical contact with the terminals of the two electrical connectors. Through such a configuration, when the bridge connector is coupled to the two electrical connectors, the ground terminals of the bridge connector can enable the terminals of the two electrical connectors to electrically conduct with the conductive plastic, thereby preventing the problem of crosstalk between differential signals caused by high-speed signal transmission. Therefore, the electrical connection assembly can meet the transmission of high-frequency signals and is beneficial to improve transmission bandwidth and increase electronic signal frequency, and is suitable for a large amount of data transmission requirements. In addition, the electrical connection assembly can change (i.e., increase) a mating height between two electrical connectors of different devices by changing (i.e., increasing) the height of the bridge connector, which not only benefits design flexibility but also improves transmission rate.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
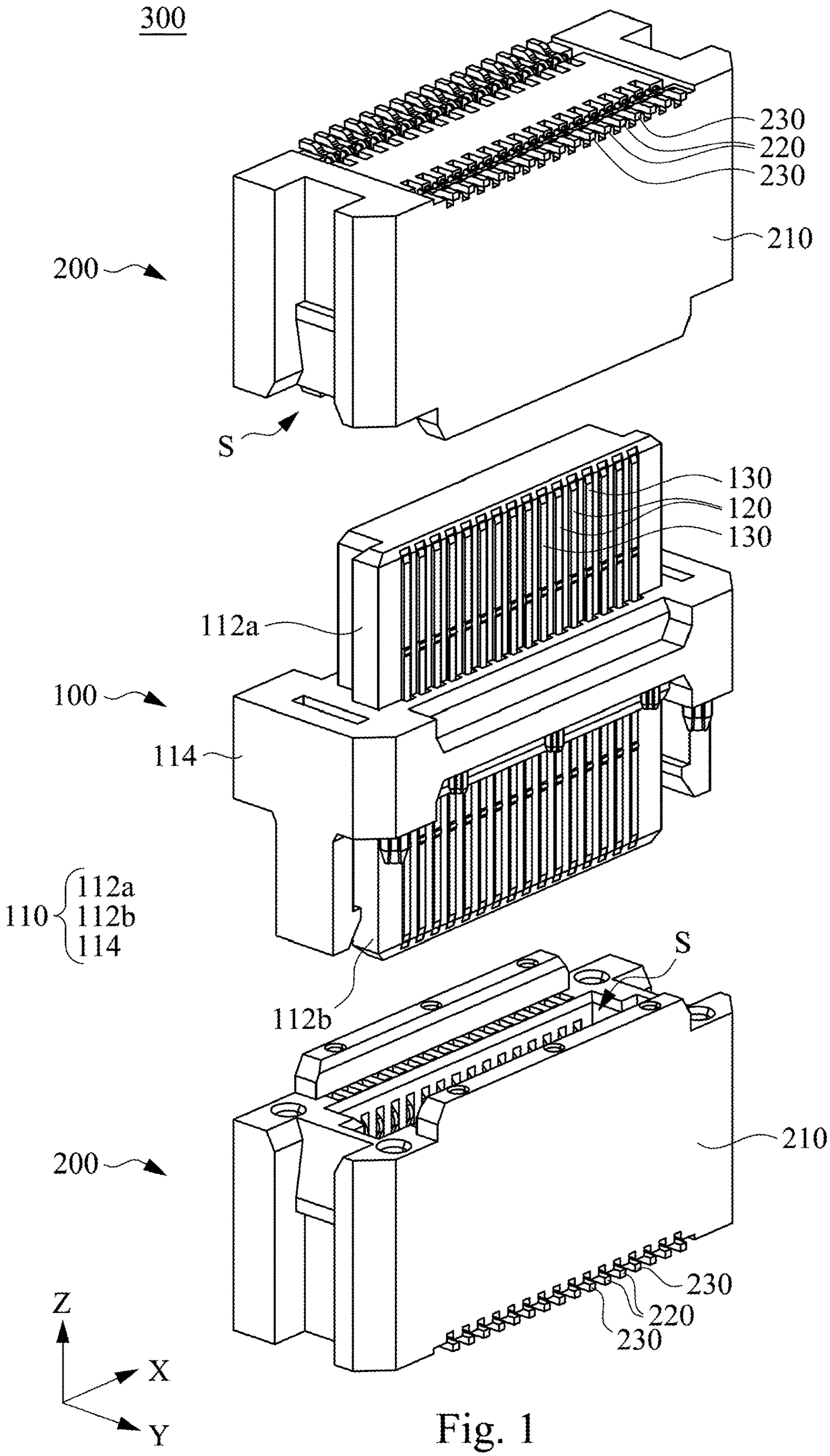
FIG. 1 is an exploded view of an electrical connection assembly according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is an exploded view of an electrical connection assembly 300 according to one embodiment of the present disclosure. As shown in FIG. 1, the electrical connection assembly 300 includes two electrical connectors 200 and a bridge connector 100. The bridge connector 100 is configured to couple to the two electrical connectors 200. The electrical connector 200 may be disposed on a printed circuit board to serve as a board end connector, or may be connected to a cable to serve as wire end connector. In some embodiments, the electrical connection assembly 300 may be applied to a server and a workstation, but the present disclosure is not limited in this regard. Each of the two electrical connectors 200 includes plural terminals and an insulation housing 210 that accommodates the terminals. For example, the electrical connector 200 may include plural signal terminals 220 and plural ground terminals 230. The signal terminals 220 and the ground terminals 230 are located in an accommodating recess S of the insulation housing 210, and the ground terminals 230 and the signal terminals 220 are arranged at intervals, such as in a parallel arrangement along the X-axis. In this embodiment, any two adjacent signal terminals 220 are located between two of the ground terminals 230, such as an arrangement with the order of the ground terminal 230, the signal terminal 220, the signal terminal 220, and the ground terminal 230. In such a configuration, two adjacent signal terminals 220 may be a pair of differential signal terminals.

After the two electrical connectors 200 are assembled to the bridge connector 100, the bridge connector 100 is located between the two electrical connectors 200. In this embodiment, the insulation housing 210 of the electrical connector 200 has the accommodating recess S configured to be inserted by the bridge connector 100. An insulation body 110 of the bridge connector 100 has two opposite protruding portions 112*a* and 112*b* and a block portion surrounding the two protruding portions 112*a* and 112*b*. For example, the two protruding portions 112*a* and 112*b* extend upward and downward respectively. The two protruding portions 112*a* and 112*b* are configured to be respectively inserted into the two accommodating recesses S of the two electrical connectors 200. In such a design, when the two protruding portions 112*a* and 112*b* of the insulation body 110 of the bridge connector 100 are respectively inserted into the two accommodating recesses S of the two electrical connectors 200, two opposite sides (e.g., top and bottom surfaces) of the block portion 114 may respectively abut against the two insulation housings 210 of the two electrical connectors 200.

Figure 2:
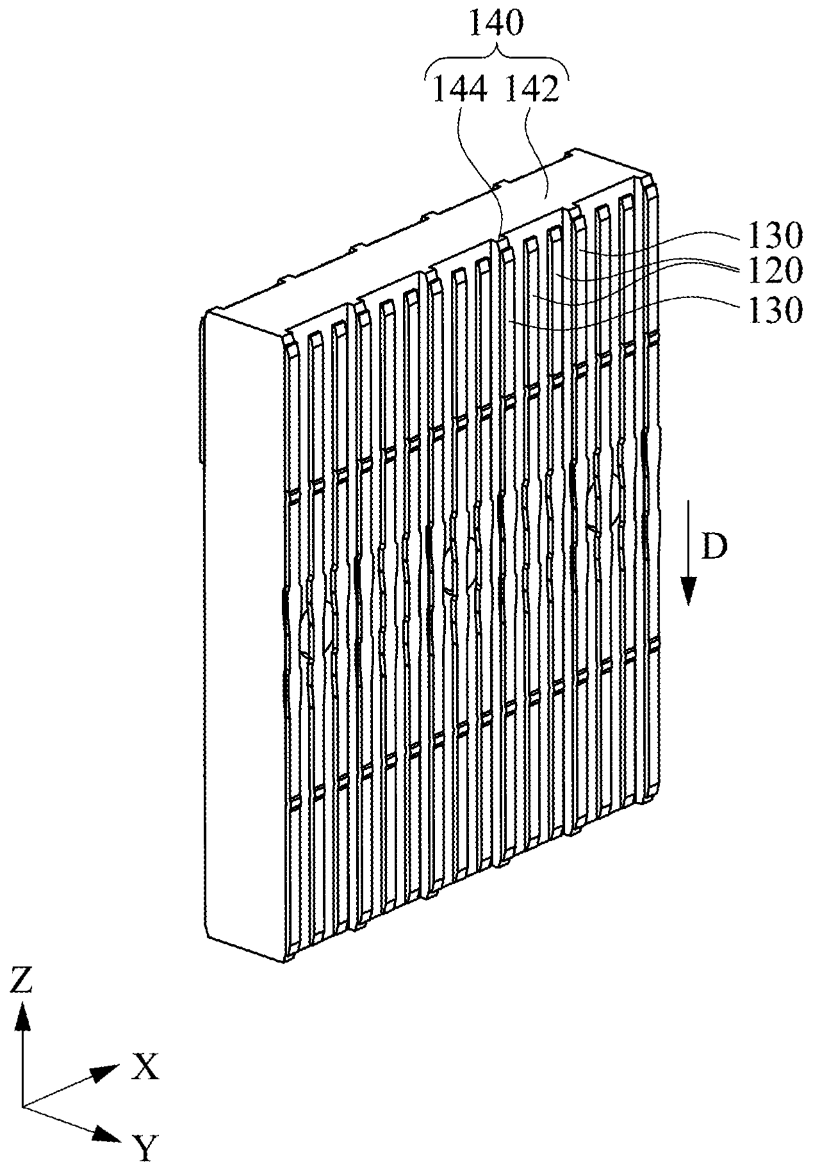
FIG. 2 is a perspective view of a bridge connector of FIG. 1, in which an insulation body is removed.

FIG. 2 is a perspective view of the bridge connector 100 of FIG. 1, in which the insulation body 110 is removed. As shown in FIG. 1 and FIG. 2, the bridge connector 100 includes the insulation body 110, plural signal terminals 120, plural ground terminals 130, and a conductive plastic 140. The conductive plastic 140 is covered by the insulation body 110. The ground terminals 130 and the signal terminals 120 of the bridge connector 100 are arranged at intervals, such as in a parallel arrangement along the X-axis. In some embodiments, any two adjacent signal terminals 120 are located between two of the ground terminals 130, such as an arrangement with the order of the ground terminal 130, the signal terminal 120, the signal terminal 120, and the ground terminal 130. In such a configuration, two adjacent signal terminals 120 of the bridge connector 100 may be used to couple to the signal terminals 220 of the electrical connector 200 for transmitting differential signals. In addition, the ground terminals 130 of the bridge connector 100 are in electrical contact with the conductive plastic 140, and the signal terminals 120 are spaced apart from the conductive plastic 140 so as not to be electrically connected to each other.

In this embodiment, the conductive plastic 140 may be I-shaped or 王-shaped. The conductive plastic 140 has a main portion 142 and plural finger portions 144 protruding from the main portion 142. The ground terminals 130 of the bridge connector 100 are respectively located on the finger portions 144. The lengthwise direction of the finger portions 144 of the conductive plastic 140 is the same as the lengthwise direction of the ground terminals 130, such as a direction D.

In some embodiments, the insulation body 110 of FIG. 1 may be formed by compression molding or injection molding applied to the structure of FIG. 2, thereby positioning the signal terminals 120 and the ground terminals 130. Each of the signal terminals 120 and the ground terminals 130 extend from one protruding portion 112*a* of the insulation body 110 to another protruding portion 112*b*. The material of the insulation body 110 may be plastic, the material of the signal terminal 120 and the material of the ground terminal 130 may be meta (e.g., copper), and the material of the conductive plastic 140 may include plastic and a conductive material (e.g., gold, silver, or copper) doped in plastic. Through the aforementioned design, the resistance of the conductive plastic 140 is greater than the resistance of the ground terminal 130, but less than the resistance of the insulation body 110.

In the following description, the state about the ground terminals 130 and 230 and the signal terminals 120 and 220 after the electrical connectors 200 are coupled to the bridge connector 100 will be described.

Figure 3:
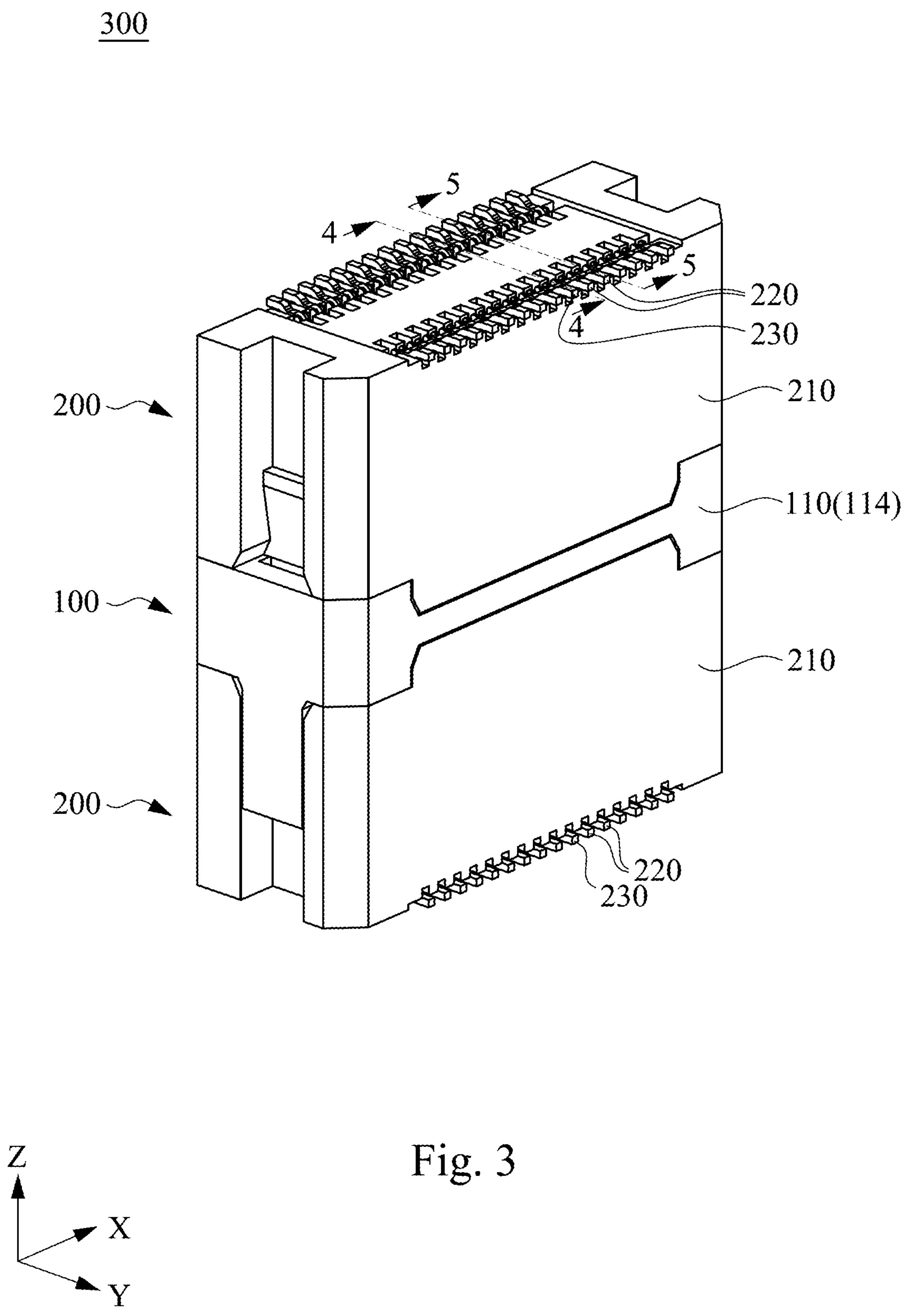
FIG. 3 is a perspective view of electrical connectors and the bridge connector of the electrical connection assembly of FIG. 1 after being coupled to each other.
Figure 4:
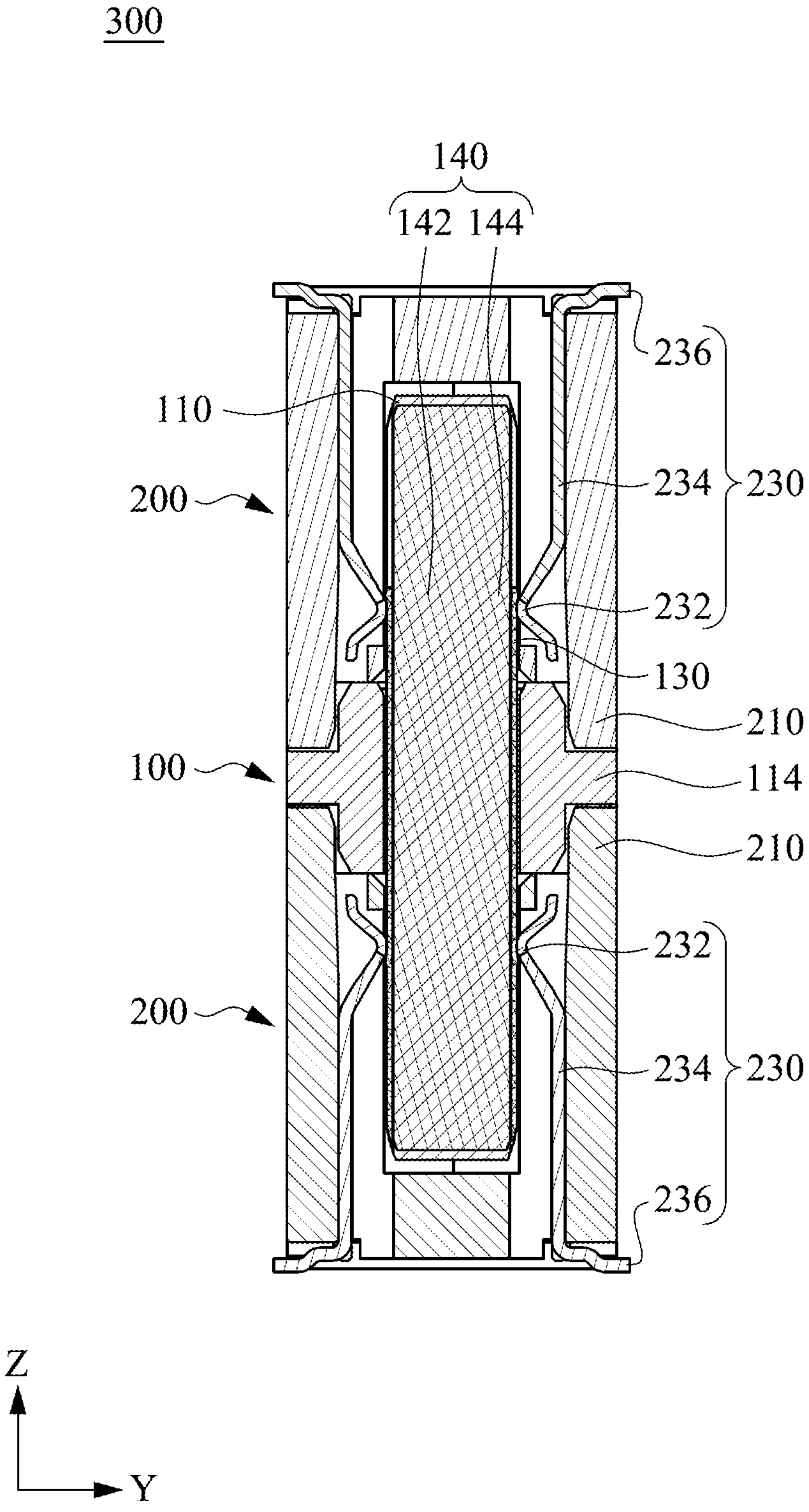
FIG. 4 is a cross-sectional view of the electrical connection assembly taken along line 4-4 of FIG. 3.

FIG. 3 is a perspective view of electrical connectors 200 and the bridge connector 100 of the electrical connection assembly 300 of FIG. 1 after being coupled to each other. FIG. 4 is a cross-sectional view of the electrical connection assembly 300 taken along line 4-4 of FIG. 3. As shown in FIG. 3 and FIG. 4, specifically, since the bridge connector 100 of the electrical connection assembly 300 has the conductive plastic 140, the signal terminals 120 and the ground terminals 130, and the ground terminals 130 of the bridge connector 100 are in electrical contact with the conductive plastic 140, when two opposite sides of the insulation body 110 of the bridge connector 100 are respectively coupled to the two electrical connectors 200 so as to be surrounded by the two electrical connectors 200, the ground terminals 130 of the bridge connector 100 can be respectively in electrical contact with the ground terminals 230 of the two electrical connectors 200. Through such a configuration, when the bridge connector 100 is coupled to the two electrical connectors 200, the ground terminals 130 of the bridge connector 100 can enable the ground terminals 230 of the two electrical connectors 200 to electrically conduct with the conductive plastic 140, thereby preventing the problem of crosstalk between differential signals caused by high-speed signal transmission. Therefore, the electrical connection assembly 300 can meet the transmission of high-frequency signals and is beneficial to improve transmission bandwidth and increase electronic signal frequency, and is suitable for a large amount of data transmission requirements. In addition, the electrical connection assembly 300 can change (i.e., increase) a mating height between two electrical connectors 200 of different devices by changing (i.e., increasing) the height of the bridge connector 100, which not only benefits design flexibility but also improves transmission rate.

The ground terminal 230 of the electrical connector 200 includes a contact portion 232, a fixed portion 234, and a welding portion 236 that are connected in sequence. The welding portion 236 extends outward from the surface of the insulation housing 210 facing away from the bridge connector 100. When two opposite sides of the insulation body 110 of the bridge connector 100 are respectively coupled to the two electrical connectors 200 so as to be surrounded by the two electrical connectors 200, the contact portion 232 of the ground terminal 230 of the electrical connector 200 is in electrical contact with the ground terminal 130 of the bridge connector 100. In this state, the ground terminals 130 of the bridge connector 100 are located between the finger portions 144 (may also see FIG. 2) of the conductive plastic 140 and the ground terminal 230 of the electrical connector 200. The fixed portion 234 of the ground terminal 230 of the electrical connector 200 may be positioned on the inner sidewall of the insulation housing 210, and the welding portion 236 of the ground terminal 230 may be used for being soldered on a printed circuit board.

Figure 5:
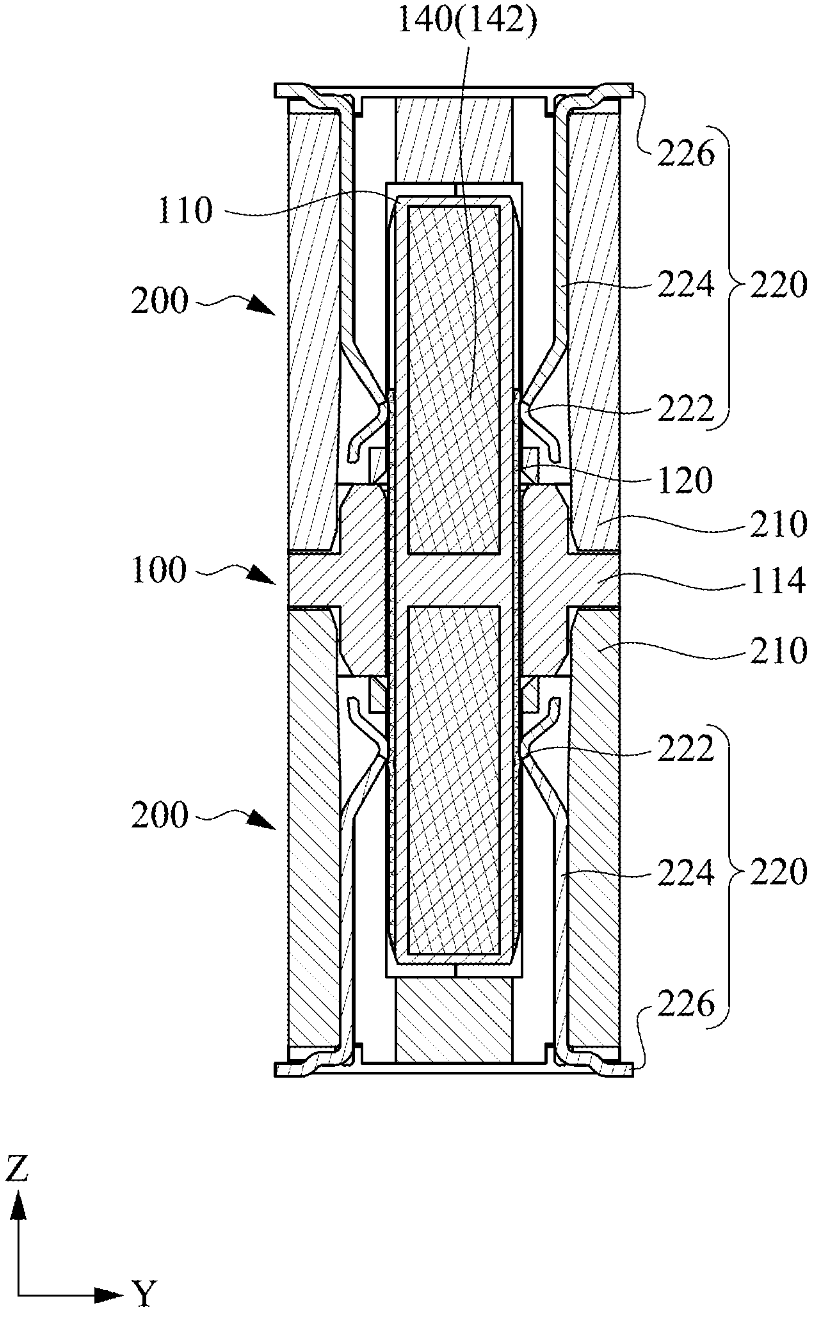
FIG. 5 is a cross-sectional view of the electrical connection assembly taken along line 5-5 of FIG. 3.

FIG. 5 is a cross-sectional view of the electrical connection assembly 300 taken along line 5-5 of FIG. 3. As shown in FIG. 3 and FIG. 5, the signal terminal 220 of the electrical connector 200 includes a contact portion 222, a fixed portion 224, and a welding portion 226 that are connected in sequence. When two opposite sides of the insulation body 110 of the bridge connector 100 are respectively coupled to the two electrical connectors 200 so as to be surrounded by the two electrical connectors 200, the contact portion 222 of the signal terminal 220 of the electrical connector 200 is in electrical contact with the signal terminal 120 of the bridge connector 100. In this state, the signal terminals 120 of the bridge connector 100 are located between the insulation body 110 and the signal terminal 220 of the electrical connector 200. In addition, the fixed portion 224 of the signal terminal 220 of the electrical connector 200 may be positioned on the inner sidewall of the insulation housing 210, and the welding portion 226 of the signal terminal 220 may be used for being soldered on a printed circuit board.

When the bridge connector 100 is inserted into the accommodating recess S (see FIG. 1) of the insulation housing 210 of the electrical connector 200, the signal terminals 220 of the electrical connector 200 can be respectively electrically connected to the signal terminals 120 of the bridge connector 100 to transmit signals. In this state, two signal terminals 220 corresponding in position and respectively in the two electrical connectors 200 on the upper and lower sides of the bridge connector 100 can be electrically conducted with each other for transmitting signals through one of the signal terminals 120 of the bridge connector 100.

It is to be noted that the connection relationships, the materials, and the advantages of the elements described above will not be repeated in the following description. In the following description, the ground terminals 130 and the conductive plastic 140 of the bridge connector 100 will be explained in detail.

Figure 6:
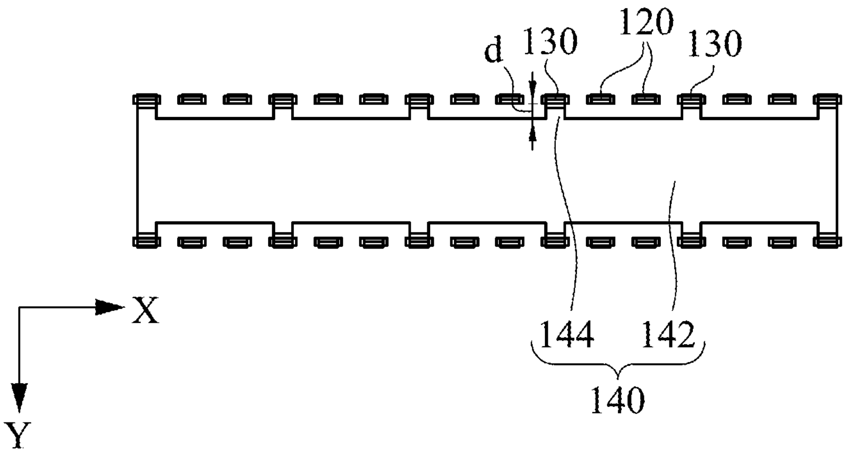
FIG. 6 is a top view of a conductive plastic, signal terminals, and ground terminals of FIG. 2.
Figure 7:
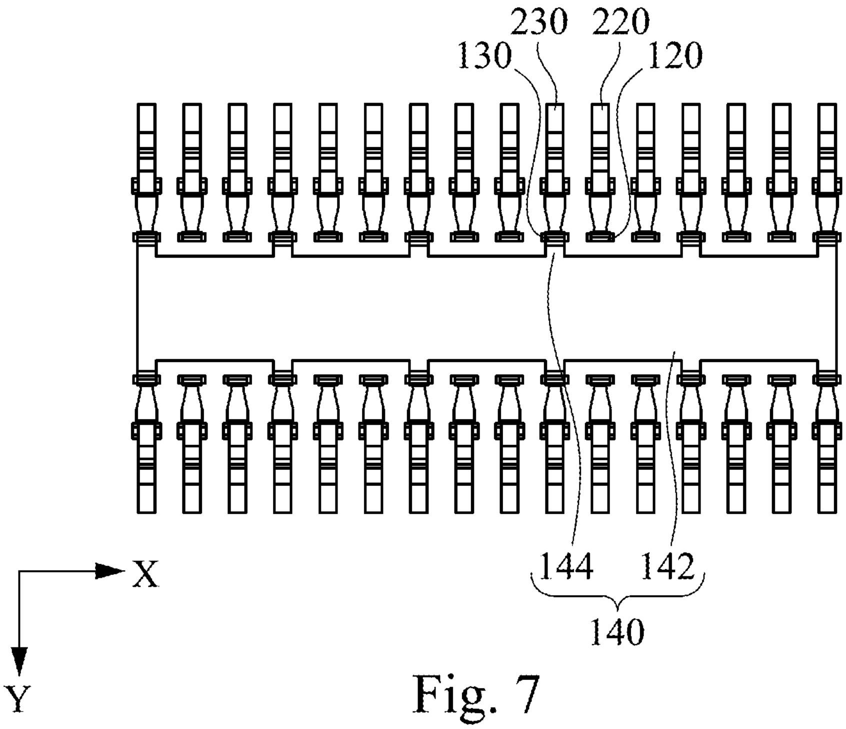
FIG. 7 is a top view of the signal terminals and the ground terminals of FIG. 6 after being respectively coupled to signal terminals and the ground terminals of the electrical connector.

FIG. 6 is a top view of the conductive plastic 140, the signal terminals 120, and the ground terminals 130 of FIG. 2. FIG. 7 is a top view of the signal terminals 120 and the ground terminals 130 of FIG. 6 after being respectively coupled to the signal terminals 220 and the ground terminals 230 of the electrical connector 200. As shown in FIG. 6 and FIG. 7, the finger portions 144 of the conductive plastic 140 are symmetrically disposed along two opposite sides of the main portion 142. There is a distance d between the main portion 142 and a side of each of the finger portions 144 that is distal to the main portion 142. Through the aforementioned configuration, the conductive plastic 140 may present I-shaped or 王-shaped. The ground terminals 130 on the finger portions 144 may be in electrical contact with the ground terminals 230 (may also see FIG. 4) of the electrical connector 200, while the signal terminals 120 spaced apart from the conductive plastic 140 may be in electrical contact with the signal terminals 220 (may also see FIG. 5) of the electrical connector 200.

Moreover, a distance between two adjacent finger portions 144 of the conductive plastic 140 is greater than a distance between two adjacent signal terminals 120. Such a configuration can ensure that the signal terminals 120 are not in contact with the finger portions 144 of the conductive plastic 140 or the ground terminals 130 in the X-axis direction to cause abnormal signals and structural interference.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electrical connection assembly, comprising:

two electrical connectors, wherein each of the two electrical connectors includes a plurality of terminals and an insulation housing that accommodates the terminals; and a bridge connector located between the two electrical connectors and comprising an insulation body, a conductive plastic, a plurality of signal terminals, and a plurality of ground terminals, wherein the conductive plastic has a main portion and a plurality of finger portions protruding from the main portion, the ground terminals are respectively located on the finger portions, the main portion is a block body, each of the finger portions has two end portions away from each other, each of the ground terminals extends from one of the two end portions to the other of the two end portions, the conductive plastic is covered by the insulation body, the ground terminals and the signal terminals of the bridge connector are arranged at intervals, and the ground terminals of the bridge connector are in electrical contact with the conductive plastic.

2. The electrical connection assembly of claim 1, wherein the conductive plastic is I-shaped.

3. The electrical connection assembly of claim 1, wherein when two opposite sides of the insulation body are respectively coupled to the two electrical connectors so as to be surrounded by the two electrical connectors, the ground terminals of the bridge connector are located between the conductive plastic and the terminals of the two electrical connectors.

4. The electrical connection assembly of claim 1, wherein the finger portions are symmetrically disposed along two opposite sides of the main portion.

5. The electrical connection assembly of claim 1, wherein there is a distance between the main portion and a side of each of the finger portions that is distal to the main portion.

6. The electrical connection assembly of claim 1, wherein a lengthwise direction of the finger portions of the conductive plastic is the same as a lengthwise direction of the ground terminals of the bridge connector.

7. The electrical connection assembly of claim 1, wherein a distance between two adjacent ones of the finger portions of the conductive plastic is greater than a distance between two adjacent ones of the signal terminals.

8. The electrical connection assembly of claim 1, wherein each of the terminals of the two electrical connectors comprises a contact portion, a fixed portion, and a welding portion that are connected in sequence, and the contact portion extends outward from a surface facing away from the bridge connector, and when two opposite sides of the insulation body are respectively coupled to the two electrical connectors so as to be surrounded by the two electrical connectors, the contact portion is in electrical contact with one of the ground terminals of the bridge connector.

9. The electrical connection assembly of claim 1, wherein each of the two electrical connectors has an accommodating recess, the insulation body of the bridge connector has two protruding portions facing away from each other, the two protruding portions are respectively inserted into the two accommodating recesses of the two electrical connectors, and the ground terminals of the bridge connector extend from one of the two protruding portions to the other.

10. The electrical connection assembly of claim 9, wherein the insulation body of the bridge connector has a block portion surrounding the two protruding portions, and when the two protruding portions are configured to be respectively inserted into the two accommodating recesses, two opposite sides of the block portion respectively abut against the two electrical connectors.

11. The electrical connection assembly of claim 1, wherein the signal terminals of the bridge connector are spaced apart from the conductive plastic.

12. An electrical connection assembly, comprising:

two electrical connectors, wherein each of the two electrical connectors includes a plurality of terminals and an insulation housing that accommodates the terminals; and a bridge connector located between the two electrical connectors and comprising an insulation body, a conductive plastic, a plurality of signal terminals, and a plurality of ground terminals, wherein the conductive plastic has a main portion and a plurality of finger portions protruding from the main portion, the ground terminals are respectively located on the finger portions, the main portion is a block body, each of the finger portions has two end portions away from each other, each of the ground terminals extends from one of the two end portions to the other of the two end portions, the conductive plastic is covered by the insulation body, the ground terminals and the signal terminals of the bridge connector are arranged at intervals, and when two opposite sides of the insulation body are respectively coupled to the two electrical connectors so as to be surrounded by the two electrical connectors, the ground terminals of the bridge connector are located between the conductive plastic and the terminals of the two electrical connectors.

13. The electrical connection assembly of claim 12, wherein the signal terminals of the bridge connector are spaced apart from the conductive plastic.

* * * * *